United States Patent
Lu et al.

(10) Patent No.: US 11,277,856 B2
(45) Date of Patent: Mar. 15, 2022

(54) SYSTEMS AND METHODS FOR DYNAMIC SCHEDULING

(71) Applicant: Facebook Technologies, LLC, Menlo Park, CA (US)

(72) Inventors: Gang Lu, Pleasanton, CA (US); Dong Zheng, Saratoga, CA (US); Qi Qu, Redmond, WA (US); Yuting Fan, Redmond, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 86 days.

(21) Appl. No.: 16/778,488

(22) Filed: Jan. 31, 2020

(65) Prior Publication Data
US 2020/0288492 A1    Sep. 10, 2020

Related U.S. Application Data

(60) Provisional application No. 62/815,834, filed on Mar. 8, 2019.

(51) Int. Cl.
*H04W 72/12* (2009.01)
*G06F 3/14* (2006.01)

(52) U.S. Cl.
CPC .......... *H04W 72/1273* (2013.01); *G06F 3/14* (2013.01); *H04W 72/1268* (2013.01)

(58) Field of Classification Search
CPC ......... H04W 72/1273; H04W 72/1268; H04W 72/1263; G06F 3/14; G06F 3/147; G09G 2370/16; G09G 2354/00; G09G 5/12; H04N 21/816; H04N 21/41265; H04N 21/42201; H04N 21/42222; H04N 21/43637; H04N 21/437; H04N 21/438; H04N 21/4436
See application file for complete search history.

(56) References Cited

U.S. PATENT DOCUMENTS

2014/0349745 A1* 11/2014 Russo ................ A63F 13/327
                                                463/29
2015/0062022 A1*  3/2015 Rabii ................ G02B 27/017
                                                345/173

FOREIGN PATENT DOCUMENTS

CN      108809545 A     11/2018
WO    WO-2019/032148 A1  2/2019

OTHER PUBLICATIONS

International Search Report and Written Opinion for PCT/US2020/020769 dated May 8, 2020.

* cited by examiner

*Primary Examiner* — Vinncelas Louis
(74) *Attorney, Agent, or Firm* — Foley & Lardner LLP

(57) ABSTRACT

Disclosed herein a system, a method and a device for dynamic scheduling between a head wearable display and a console is provided. The head wearable display can initiate, at a first time instance, a first downlink transmission to the console. The head wearable display can dynamically indicate, to the console, an end of the first downlink transmission, at a second time instance when transfer of data of the first downlink transmission is complete. The head wearable display can dynamically cause, relative to the second time instance, the console to begin an uplink transmission. The head wearable display can receive an indication to dynamically start a second downlink transmission, at a third time instance when transfer of data of the uplink transmission is complete.

20 Claims, 8 Drawing Sheets

SYSTEMS AND METHODS FOR DYNAMIC SCHEDULING

CROSS-REFERENCE TO RELATED APPLICATION

This application claims priority to U.S. Provisional Patent Application No. 62/815,834, filed Mar. 8, 2019, which is incorporated by reference in its entirety for all purposes.

FIELD OF DISCLOSURE

The present disclosure is generally related to display systems and methods, including but not limited to systems and methods for dynamic scheduling.

BACKGROUND

Wearable display technologies can provide a virtual reality or augmented reality experience to a user wearing the respective display device. They can provide a series of computer generated images to allow the user to interact with the respective images. For example, the display devices can include head wearable devices that are positioned over or within the field of view of the user such that the field of view of the display device replaces the user's natural field of view.

SUMMARY

Devices, systems and methods for dynamic scheduling are provided herein. A head wearable display (HWD) can be connected with a console to provide a virtual reality (VR), augmented reality (AR) or mixed reality (MR) application (e.g., VR./AR/MR experience) to a user of the head wearable display. In some embodiments, one or more aspects of communication between the console and the head wearable display can be dynamically scheduled or modified to provide flexible scheduling and improved efficiency. For example, a wake up time period of the communications can include a dynamic data transmission interval having one or more downlink (DL) periods and/or uplink (UL) periods for transmissions. DL transmission may refer to a transmission from a HWD to a console. UP transmission may refer to transmission from the console to the HWD. In some embodiments, a duration of the data transmission interval can be dynamically determined or modified (e.g., extended, shortened), for example, during the respective data transmission interval. A duration of a downlink period and/or uplink period of a data transmission interval can be modified (e.g., extended, shortened) during the respective downlink period and/or uplink period to provide flexible scheduling. The number of DL/UL pairs for a data transmission interval can be modified during the data transmission interval, for example, to add additional DL/UL pairs or to extend a DL/UL pair. In some embodiments, a subsequent wakeup time and/or wake up interval can be determined at the end of a current or previous duty cycle. A duty cycle can include or correspond to a cycle or operation of a machine, device, or computing device that operates intermittently (e.g., active periods) rather than continuously. In some embodiments, a duty cycle can include a ratio or percentage of time that a device (e.g., HWD, console) is active (e.g., turned on, active period, power cycle) compared to a period of time when the device is inactive or turned off. Thus, dynamic scheduling can improve efficiency and save power, for example, in contrast to duty cycles having fixed durations.

In at least one aspect, a method is provided. The method can include initiating, by a head wearable display at a first time instance, a first downlink transmission to a console. The method can include dynamically indicating, by the head wearable display to the console, an end of the first downlink transmission, at a second time instance when transfer of data of the first downlink transmission is complete. The method can include dynamically causing, by the head wearable display, relative to the second time instance, the console to begin an uplink transmission. The method can include receiving, by the head wearable display, an indication to dynamically start a second downlink transmission, at a third time instance when transfer of data of the uplink transmission is complete.

In some embodiments, the method can include estimating an expected duration for a data transmission interval between the head wearable display and the console according to an amount of data to be transferred and properties of a channel between the head wearable display and the console. The data transmission interval can include the first downlink transmission and the uplink transmission. The method can include estimating, by the head wearable display, a time period for the first downlink transmission. The method can include determining, by the head wearable display, that there is additional data to transmit for the first downlink transmission and responsive to the determination, continuing, by the head wearable display, to transfer data to the console beyond the estimated time period for the first downlink transmission.

In some embodiments, the method can include estimating, by the console, a time period for the uplink transmission. The method can include determining, by the console, that there is additional data to transmit for the uplink transmission and responsive to the determination, continuing, by the console, to transfer data to the head wearable display beyond the estimated time period for the uplink transmission. The method can include dynamically supporting, by the head wearable display at a fourth time instance, addition of one or more link pairs for a data transmission interval between the head wearable display and the console according to data available at the fourth time instance. In some embodiments, each link pair can include at least one downlink transmission and at least one uplink transmission.

In some embodiments, a first wake up time period can include the first downlink transmission, the uplink transmission and the second downlink transmission. The method can include dynamically determining, by the console, to add a second wake up time period to support additional one or more downlink transmissions and one or more uplink transmissions. The method can include dynamically configuring a duration of a sleep time period between the first wake up time period and the second wake up time period.

In at least one aspect, a head wearable display is provided. The head wearable display can include one or more processors configured to initiate, at a first time instance, a first downlink transmission to a console. The one or more processors can be configured to dynamically indicate, to the console, an end of the first downlink transmission, at a second time instance when transfer of data of the first downlink transmission is complete. The one or more processors can be configured to dynamically cause the console to begin an uplink transmission relative to the second time instance. The one or more processors can be configured to receive an indication to dynamically start a second downlink transmission, at a third time instance when transfer of data of the uplink transmission is complete.

In some embodiments, the one or more processors can be configured to estimate a time period for the first downlink transmission. The one or more processors can be configured to determine that there is additional data to transmit for the first downlink transmission and responsive to the determination, continue to transfer data to the console beyond the estimated time period for the first downlink transmission. The one or more processors can be configured to cause the console to estimate a time period for the uplink transmission.

In some embodiments, the one or more processors can be configured to cause the console to determine that there is additional data to transmit for the uplink transmission, and responsive to the determination, causing the console to continue to transfer data to the head wearable display beyond the estimated time period for the uplink transmission. The one or more processors can be configured to dynamically support, at a fourth time instance, addition of one or more link pairs for a data transmission interval between the head wearable display and the console according to data available at the fourth time instance. In some embodiments, each link pair can include at least one downlink transmission and at least one uplink transmission.

In some embodiments, a first wake up time period can include the first downlink transmission, the uplink transmission and the second downlink transmission, and the one or more processors can be configured to dynamically support addition of a second wake up time period to support additional one or more downlink transmissions and one or more uplink transmissions. The one or more processors can be configured to dynamically configure a duration of a sleep time period between the first wake up time period and the second wake up time period.

In at least one aspect, a non-transitory computer readable medium storing instructions is provided. The instructions when executed by one or more processors can cause the one or more processors to initiate, at a first time instance, a first downlink transmission to a console. The instructions when executed by one or more processors can cause the one or more processors to dynamically indicate, to the console, an end of the first downlink transmission, at a second time instance when transfer of data of the first downlink transmission is complete. The instructions when executed by one or more processors can cause the one or more processors to dynamically cause the console to begin an uplink transmission relative to the second time instance. The instructions when executed by one or more processors can cause the one or more processors to receive an indication to dynamically start a second downlink transmission, at a third time instance when transfer of data of the uplink transmission is complete.

In some embodiments, the instructions when executed by one or more processors can cause the one or more processors to estimate a time period for the first downlink transmission. The instructions when executed by one or more processors can cause the one or more processors to determine that there is additional data to transmit for the first downlink transmission and responsive to the determination, continue to transfer data to the console beyond the estimated time period for the first downlink transmission.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1A:
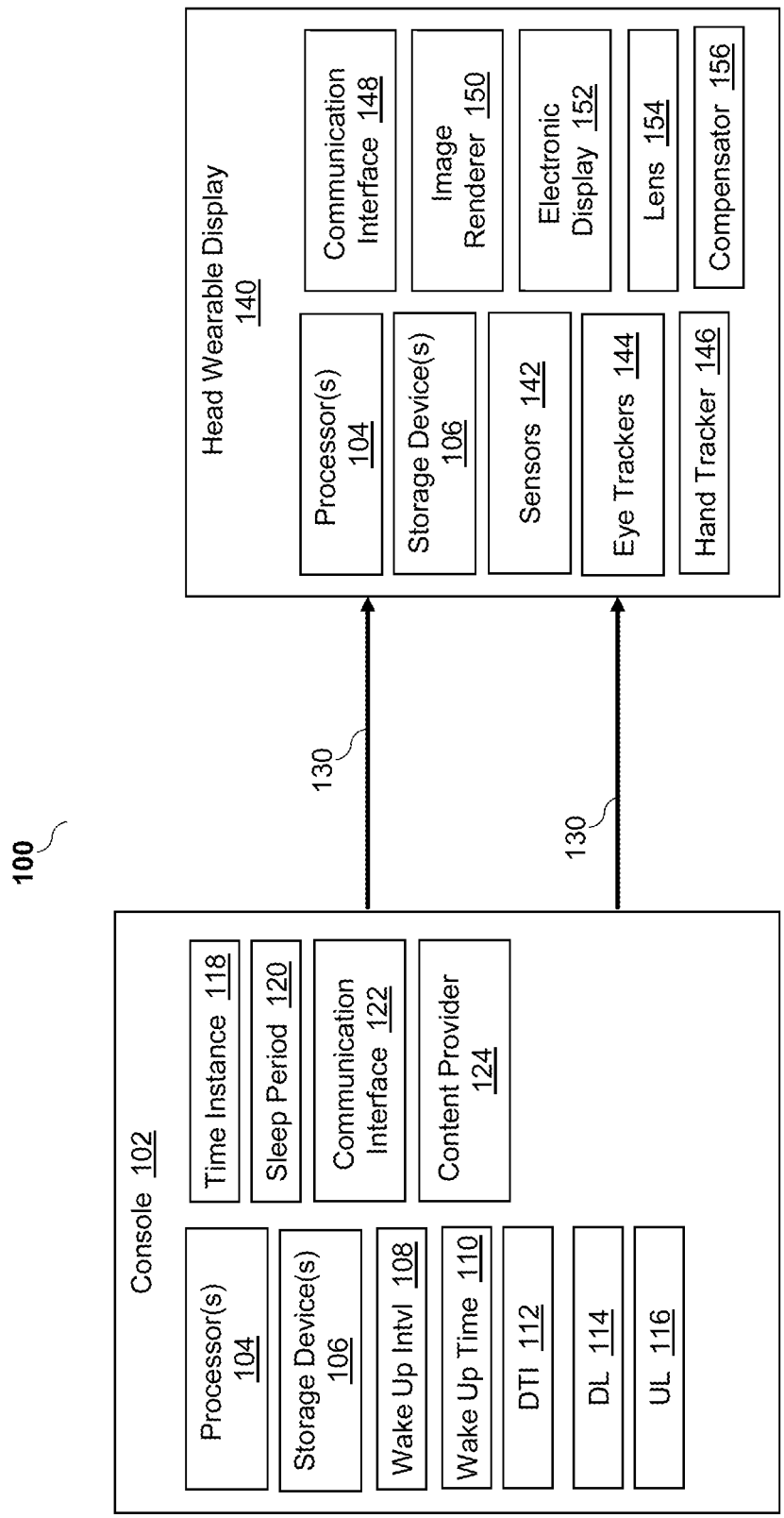
FIG. 1A is a block diagram of an embodiment of an artificial reality system for dynamically scheduling for communications between a console and head wearable display, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

For purposes of reading the description of the various embodiments of the present invention below, the following descriptions of the sections of the specification and their respective contents may be helpful:

Section A describes embodiments of devices, systems and methods for dynamically scheduling for communications between a console and a head wearable display.

Section B describes embodiments of a computing system.

A. Dynamically Scheduling

The subject matter of this disclosure is directed to systems and methods for dynamic scheduling and duty cycle schemes for communications between a console (e.g., control unit) and a head wearable display. The application shall address a wireless AR/VR/MR (sometimes collectively or generally referred as artificial reality) configuration of the head wearable display (HWD) paired with the console. The head wearable display communicates with the console, for example, through a wireless 60 GHz communication link. In one aspect, the head wearable display is periodically enabled and disabled to save power. The head wearable display can be enabled during a wake up (e.g., active mode of operation, higher power consumption) time period to communicate with the console, and disabled during a sleep (inactive or low-power mode of operation, lower poser consumption) time period when no communication with the console is needed. In general, the wake up time period and the sleep time period are fixed and not adjustable. However, the amount of sensor data and the amount of processing of the sensor data may be subject to change according to a user movement in virtual reality/augmented reality (VR/AR) application for instance. Moreover, channel condition of the communication link (e.g., 60 GHz link) between the head wearable display and the console can be subject to change, according to the user movement.

The devices, systems and methods described herein can provide for dynamically adjusting scheduling, and controlling duty cycle, to accommodate varying traffic data and/or channel condition. In one aspect, a wake up interval including a wake up time period is dynamically adjusted. A wake up interval may be a time period between a beginning of the wake up time period and a beginning of the subsequent wake up time period. Depending on the amount of sensing data (e.g., acquired and/or generated via the HWD's sensor(s)) to process or a channel link status, the wake up interval can be increased or decreased.

In one approach, a wake up time period is dynamically adjusted. A wake up time period may include multiple downlink (DL) time periods and uplink (UL) time periods. In one example, each of the DL time period and UL time period can be dynamically adjusted. In another example, a number of DL and UL pairs within the wake up interval can be adjusted. Because the wake up interval may not be fixed, a new wake up time period can be determined at the end of the current duty cycle, or a secondary communication link (e.g., Bluetooth, Wifi) can be employed to initiate the wake up process.

Referring now to FIG. 1A, an example artificial reality system 100 for dynamic scheduling is provided. In brief overview, the system 100 can include a console 102 and a head wearable display 140. The head wearable display 140 (e.g., goggle, glass, head mounted device, head wearable device) can pair with the console 102 (e.g., puck) to communicate and transfer data between the head wearable display 140 and the console 102, for example, for at least one user session for a user of the head wearable display 140. The user session can include a VR experience, AR experience or MR experience via the head wearable display 140. The head wearable display 140 can perform the data transfer (e.g., configuration settings, etc.) during a wake up interval 108 during which the head wearable display 140 can exit a sleep period 120 and initiate a wake up time period 110 to transfer and receive data from the console 102. The wake up time period 110 can be dynamically scheduled based in part on an amount of data and one or more properties of a channel 130 between the head wearable display 140 and the console 102. The head wearable display 140 and/or the console 102 can dynamically schedule a data transmission interval 112 of the wake up time period 110 such that a duration of a downlink 114 and/or uplink 116 of the data transmission interval 112 is dynamically determined, for example, during the respective downlink 114 and/or uplink 116.

In some embodiments, the artificial reality system environment 100 includes a head wearable display 140 worn by a user, and a console 102 providing content of artificial reality to the head wearable display 140. A head wearable display (HWD) may be referred to as, include, or be part of a head mounted display (HMD), head mounted device (HMD), head wearable device (HWD), head worn display (HWD) or head worn device (HWD). The head wearable display 140 may detect its location and/or orientation of the head wearable display 140, and provide the detected location/or orientation of the head wearable display 140 to the console 102. The console 102 may generate image data indicating an image of the artificial reality according to the detected location and/or orientation of the head wearable display 140 as well as a user input for the artificial reality, and transmit the image data to the head wearable display 140 for presentation. In some embodiments, the artificial reality system environment 100 includes more, fewer, or different components than shown in FIG. 1A. In some embodiments, functionality of one or more components of the artificial reality system environment 100 can be distributed among the components in a different manner than is described here. For example, some of the functionality of the console 102 may be performed by the head wearable display 140. For example, some of the functionality of the head wearable display 140 may be performed by the console 102. In some embodiments, the console 102 is integrated as part of the head wearable display 140.

Figure 4:
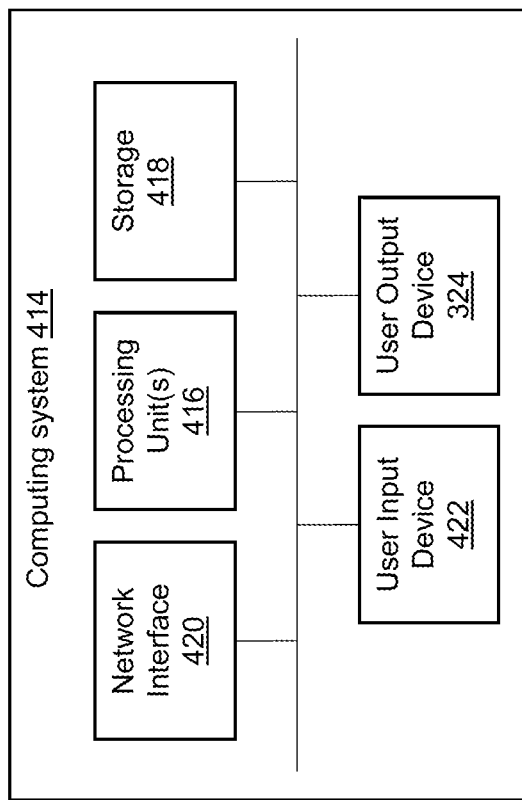
FIG. 4 is a block diagram of a computing environment according to an example implementation of the present disclosure.

Various components and elements of the artificial reality system 100 may be implemented on or using components or elements of the computing environment shown in FIG. 4 and subsequently described. For instance, the console 102 and head wearable display 140 may include or incorporate a computing system similar to the computing system 414 shown in FIG. 4 and subsequently described. The console 102 and head wearable display 140 may include one or more processing unit(s) 416, storage 418, a network interface 420, user input device 422, and/or user output device 424.

The console 102 can include a computing system or WiFi device. In some embodiments, the console 102 can be implemented, for example, as a wearable computing device (e.g., smart watch, smart eyeglasses, head wearable display), smartphone, other mobile phone, device (e.g., consumer device), desktop computer, laptop computer, a virtual reality (VR) puck, a VR personal computer (PC), VR computing device, a head wearable device, or implemented with distributed computing devices. The console 102 can be implemented to provide VR, augmented reality (AR), and/or mixed reality (MR) experience. In some embodiments, the console 102 can include conventional, specialized or custom computer components such as processors 104, a storage device 106, a network interface, a user input device, and/or a user output device. In embodiments, the console 102 may include some elements of the device shown in FIG. 4 and subsequently described.

The head wearable display 140 can include a computing system or WiFi device. In some embodiments, the head wearable display 140 can be implemented, for example, as a wearable computing device (e.g., smart watch, smart eyeglasses, head wearable display), smartphone, other mobile phone, device (e.g., consumer device), desktop computer, laptop computer, a virtual reality (VR) puck, a VR personal computer (PC), VR computing device, a head wearable device, or implemented with distributed computing devices. The head wearable display 140 can be implemented to provide VR, augmented reality (AR), and/or mixed reality (MR) experience to a user (e.g., wearing the display) of the head wearable display 140. In some embodiments, the head wearable display 140 can include conventional, specialized or custom computer components such as processors 104, a storage device 106, a network interface, a user input device, and/or a user output device. In embodiments, the head wearable display 140 may include some elements of the device shown in FIG. 4 and subsequently described.

The console 102 and the head wearable display 140 can include one or more processors 104. The one or more processors 104 can include any logic, circuitry and/or processing component (e.g., a microprocessor) for pre-processing input data for the console 102 and/or head wearable display 140, and/or for post-processing output data for the console 102 and/or head wearable display 140. The one or more processors 104 can provide logic, circuitry, processing component and/or functionality for configuring, controlling and/or managing one or more operations of the console 102 and/or head wearable display 140. For instance, a processor 104 may receive data and metrics for, including but not limited to, wake up time periods 110, data transmission intervals 112, downlinks 114 and uplinks 116 and sleep periods 120.

The console 102 and head wearable display 140 can include a storage device 106. The storage device 106 can be designed or implemented to store, hold or maintain any type or form of data associated with the console 102 and head wearable display 140. For example, the console 102 and the head wearable display 140 can store data corresponding to one or more of wake up time periods 110, data transmission intervals 112, downlinks 114 and uplinks 116 and sleep periods 120. The storage device 106 can include a static random access memory (SRAM) or internal SRAM, internal to the console 102. In embodiments, the storage device 106 can be included within an integrated circuit of the console 102. The storage device 106 can include a memory (e.g., memory, memory unit, storage device, etc.). The memory may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an example embodiment, the memory is communicably connected to the processor 104 via a processing circuit and includes computer code for executing (e.g., by the processing circuit and/or the processor) the one or more processes or methods (e.g., method 300) described herein.

The console 102 can establish one or more channels 130 to the head wearable display 140. In some embodiments, the head wearable display 140 can establish one or more channels 130 to the console 102. The channels 130 can include a connection (e.g., wireless connection), session (e.g., user session) or link established between the console 102 and the head wearable display 140. The channel 130 can include a high capacity, low latency and power saving connection established between the console 102 and the head wearable display 140. In some embodiments, the channel 130 can include, but not limited to, a millimeter wave spectrum connection or a connection frequency ranging from 30 Ghz to 300 GHz. In some embodiments, the channel 130 can include, but not limited to, a 60 GHz frequency connection (e.g., 60 GHZ WiFi, IEEE 802.11ad). The channel 130 can be used to provide or support a VR experience, AR experience or MR experience for a user of the head wearable display 140. In some embodiments, the channel 130 can include can be established using different forms of short-range wireless communications technologies including, but not limited to, a Bluetooth (BT), a Bluetooth low energy (BLE), and/or low power WiFi.

The head wearable display 140 and/or the console 102 can establish one or more wake up intervals 108. The wake up intervals 108 can include at least one wake up time period 110 and at least one sleep period 120 for transmissions and communications between the head wearable display 140 and the console 102. In some embodiments, the wake up interval 108 can be dynamically determined or scheduled, for example, during a current or previous wake up time period 110. In some embodiments, a duration or length of a wake up interval 108 can be modified (e.g., extended, shortened) during a respective wake up interval 108 to provide flexible scheduling between the head wearable display 140 and the console 102. The wake up time period 110 can include or correspond to a communication period, configuration period and/or data transfer period between the head wearable display 140 and the console 102. In some embodiments, the head wearable display 140 and the console 102 can communicate during the wake up time period 110 to exchange data and information, such as but not limited to, configuration settings, updates, location information and/or user settings. The sleep period 120 (e.g., sleep mode) can include or correspond to a period of time that the head wearable display 140 and/or console 102 is turned off, de-activated, power saving mode, standby mode, or using a minimum level of power, for example, to conserve power usage.

The wake up time period 110 can include at least one data transmission interval 112 for the head wearable display 140 and the console 102 to receive and transfer data. The wake up time period 110 can be dynamically scheduled by the console 102 and/or the head wearable display 140 For example, in some embodiments, a start time or beginning of a subsequent wake up time period 110 can determined at the end of a previous wake up time period 110 or duty cycle. A duration or length of a wake up time period 110 can be dynamically modified, updated or adjusted (e.g., extended, shortened) during a wake up time period 110, for example, by adding one or more link pairs to the respective wake up time period 110 or removing one or more link pairs from the respective wake up time period 110. The wake up time period 110 can be determined or scheduled dynamically (e.g., may not follow a fixed schedule) based in part on an amount of data and/or properties of a channel 130 between the head wearable display 140 and the console 102.

The data transmission interval 112 can include at least one downlink period 114 (sometimes referred as downlink 114) and at least one uplink period 116 (sometimes referred as uplink 116). The console 102 and/or the head wearable display 140 can dynamically determine a duration or length of the data transmission interval 112. For example, the head wearable display and/or console 102 can dynamically determine during a data transmission interval 112 how many link pairs the respective data transmission interval 112 may include. The link pairs can include at least one downlink period 114 and at least one uplink period 116. Each link pair can include a downlink period 114 and an uplink period 116. In some embodiments, the data transmission interval 112 can include a single link pair (e.g., 1 downlink 114, 1 uplink 116) or multiple link pairs (e.g., multiple downlinks 114, multiple uplinks).

A duration or length of a data transmission interval 112 can be dynamically modified, updated or adjusted (e.g., extended, shortened) during the data transmission interval 112, for example, by modifying (e.g., extending, shorten) a duration of a downlink 114 and/or uplink 116. In some embodiments, a duration or length of a data transmission interval 112 can be dynamically modified, updated or adjusted (e.g., extended, shortened) during the data transmission interval 112, for example, by adding one or more link pairs to the respective data transmission interval 112 or removing one or more link pairs from the data transmission interval 112.

In some embodiments, the downlink period 114 can include a data transfer from the head wearable display 140 to the console 102. The downlink period 114 can include or correspond to a dynamically-adjustable/modifiable duration or length of time. For example, the downlink period 114 can be initiated without a fixed duration, and the duration of the downlink 114 can be determined during the respective downlink 114 by the head wearable display 140 and/or the console 102. In some embodiments, whether to conduct a subsequent downlink 114 can be determined at the end of or during a previous uplink 116 by the head wearable display 140 and/or the console 102. The dynamic duration of the downlink 114 can be determined based in part on an amount of data to be transferred during the downlink 114 and/or properties or characteristics of the channel 130 between the head wearable display 140 and the console 102.

In some embodiments, the uplink period 116 can include a time duration for a data transfer from the console 102 to the head wearable display 140. The uplink period 116 can include a dynamically-adjustable/modifiable duration or length of time. For example, the uplink period 116 can be initiated without a fixed duration and the duration of the uplink 116 can be determined during the respective uplink 116 by the head wearable display 140 and/or the console 102. In some embodiments, whether to conduct a subsequent uplink 116 can be determined at the end of or during a previous downlink 114 by the head wearable display 140 and/or the console 102. The dynamic duration of the uplink 116 can be determined based in part on an amount of data to be transferred during the uplink 116 and/or properties of the channel 130 between the head wearable display 140 and the console 102.

The console 102 and/or the head wearable display 140 can take or perform measurements on the channel 130 to determine one or more properties of the channel 130 (e.g., status, speed, bandwidth). The measurements can include a status measurement (e.g., on, off, activated), an availability of the channel 130, a connection speed, a signal to noise ratio, a latency value, a power consumption value and/or a reliability of the channel 130. The console 102 and/or head wearable display 140 can generate or establish one or more time instances 118. The time instances 118 can include or correspond to a particular point in time, time period, a time range, and/or a time value. In some embodiments, the time instances 118 can include or correspond to a length of time or a duration between a downlink period 114 and an uplink period 116.

In some embodiments, the head wearable display 140 is an electronic component that can be worn by a user and can present or provide an artificial reality experience to the user. The head wearable display 140 may render one or more images, video, audio, or some combination thereof to provide the artificial reality experience to the user. In some embodiments, audio is presented via an external device (e.g., speakers and/or headphones) that receives audio information from the head wearable display 140, the console 102, or both, and presents audio based on the audio information. In some embodiments, the head wearable display 140 includes sensors 142, eye trackers 144, a hand tracker 146, a communication interface 148, an image renderer 150, an electronic display 152, a lens 154, and a compensator 156. These components may operate together to detect a location of the head wearable display 140 and a gaze direction of the user wearing the head wearable display 140, and render an image of a view within the artificial reality corresponding to the detected location and/or orientation of the head wearable display 140. In other embodiments, the head wearable display 140 includes more, fewer, or different components than shown in FIG. 1A.

In some embodiments, the sensors 142 include electronic components or a combination of electronic components and software components that detect a location and an orientation of the head wearable display 140. Examples of the sensors 142 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 142 detect the translational movement and the rotational movement, and determine an orientation and location of the head wearable display 140. In one aspect, the sensors 142 can detect the translational movement and the rotational movement with respect to a previous orientation and location of the head wearable display 140, and determine a new orientation and/or location of the head wearable display 140 by accumulating or integrating the detected translational movement and/or the rotational movement. Assuming for an example that the head wearable display 140 is oriented in a direction 25 degrees from a reference direction, in response to detecting that the head wearable display 140 has rotated 20 degrees, the sensors 142 may determine that the head wearable display 140 now faces or is oriented in a direction 45 degrees from the reference direction. Assuming for another example that the head wearable display 140 was located two feet away from a reference point in a first direction, in response to detecting that the head wearable display 140 has moved three feet in a second direction, the sensors 142 may determine that the head wearable display 140 is now located at a vector multiplication of the two feet in the first direction and the three feet in the second direction.

In some embodiments, the eye trackers 144 include electronic components or a combination of electronic components and software components that determine a gaze direction of the user of the head wearable display 140. In some embodiments, the head wearable display 140, the console 102 or a combination of them may incorporate the gaze direction of the user of the head wearable display 140 to generate image data for artificial reality. In some embodiments, the eye trackers 144 include two eye trackers, where each eye tracker 144 captures an image of a corresponding eye and determines a gaze direction of the eye. In one example, the eye tracker 144 determines an angular rotation of the eye, a translation of the eye, a change in the torsion of the eye, and/or a change in shape of the eye, according to the captured image of the eye, and determines the relative gaze direction with respect to the head wearable display 140, according to the determined angular rotation, translation and the change in the torsion of the eye. In one approach, the eye tracker 144 may shine or project a predetermined reference or structured pattern on a portion of the eye, and capture an image of the eye to analyze the pattern projected on the portion of the eye to determine a relative gaze direction of the eye with respect to the head wearable display 140. In some embodiments, the eye trackers 144 incorporate the orientation of the head wearable display 140 and the relative gaze direction with respect to the head wearable display 140 to determine a gate direction of the user. Assuming for an example that the head wearable display 140 is oriented at a direction 30 degrees from a reference direction, and the relative gaze direction of the head wearable display 140 is −10 degrees (or 350 degrees) with respect to the head wearable display 140, the eye trackers 144 may determine that the gaze direction of the user is 20 degrees from the reference direction. In some embodiments, a user of the head wearable display 140 can configure the head wearable display 140 (e.g., via user settings) to enable or disable the eye trackers 144. In some embodiments, a user of the head wearable display 140 is prompted to enable or disable the eye trackers 144.

In some embodiments, the hand tracker 146 includes an electronic component or a combination of an electronic component and a software component that tracks a hand of the user. In some embodiments, the hand tracker 146 includes or is coupled to an imaging sensor (e.g., camera) and an image processor that can detect a shape, a location and an orientation of the hand. The hand tracker 146 may generate hand tracking measurements indicating the detected shape, location and orientation of the hand.

In some embodiments, the communication interface 148 includes an electronic component or a combination of an electronic component and a software component that communicates with the console 102. The communication interface 148 may communicate with a communication interface 122 of the console 102 through a communication link. The communication link may be a wireless link. Examples of the wireless link can include a cellular communication link, a near field communication link, Wi-Fi, Bluetooth, 60 GHz wireless link, or any communication wireless communication link. Through the communication link, the communication interface 148 may transmit to the console 102 data indicating the determined location and/or orientation of the head wearable display 140, the determined gaze direction of the user, and/or hand tracking measurement. Moreover, through the communication link, the communication interface 148 may receive from the console 102 image data indicating or corresponding to an image to be rendered and additional data associated with the image.

In some embodiments, the image renderer 150 includes an electronic component or a combination of an electronic component and a software component that generates one or more images for display, for example, according to a change in view of the space of the artificial reality. In some embodiments, the image renderer 150 is implemented as a processor (or a graphical processing unit (GPU)) that executes instructions to perform various functions described herein. The image renderer 150 may receive, through the communication interface 148, image data describing an image of artificial reality to be rendered and additional data associated with the image, and render the image through the electronic display 152. In some embodiments, the image data from the console 102 may be encoded, and the image renderer 150 may decode the image data to render the image. In some embodiments, the image renderer 150 receives, from the console 102 in additional data, object information indicating virtual objects in the artificial reality space and depth information indicating depth (or distances from the head wearable display 140) of the virtual objects. In one aspect, according to the image of the artificial reality, object information, depth information from the console 102, and/or updated sensor measurements from the sensors 142, the image renderer 150 may perform shading, reprojection, and/or blending to update the image of the artificial reality to correspond to the updated location and/or orientation of the head wearable display 140. Assuming that a user rotated his head after the initial sensor measurements, rather than recreating the entire image responsive to the updated sensor measurements, the image renderer 150 may generate a small portion (e.g., 10%) of an image corresponding to an updated view within the artificial reality according to the updated sensor measurements, and append the portion to the image in the image data from the console 102 through reprojection.

The image renderer 150 may perform shading and/or blending on the appended edges. Hence, without recreating the image of the artificial reality according to the updated sensor measurements, the image renderer 150 can generate the image of the artificial reality. In some embodiments, the image renderer 150 receives hand model data indicating a shape, a location and an orientation of a hand model corresponding to the hand of the user, and overlay the hand model on the image of the artificial reality. Such hand model may be presented as a visual feedback to allow a user to provide various interactions within the artificial reality.

In some embodiments, the electronic display 152 is an electronic component that displays an image. The electronic display 152 may, for example, be a liquid crystal display or an organic light emitting diode display. The electronic display 152 may be a transparent display that allows the user to see through. In some embodiments, when the head wearable display 140 is worn by a user, the electronic display 152 is located proximate (e.g., less than 3 inches) to the user's eyes. In one aspect, the electronic display 152 emits or projects light towards the user's eyes according to image generated by the image renderer 150.

In some embodiments, the lens 154 is a mechanical component that alters received light from the electronic display 152. The lens 154 may magnify the light from the electronic display 152, and correct for optical error associated with the light. The lens 154 may be a Fresnel lens, a convex lens, a concave lens, a filter, or any suitable optical component that alters the light from the electronic display 152. Through the lens 154, light from the electronic display 152 can reach the pupils, such that the user can see the image displayed by the electronic display 152, despite the close proximity of the electronic display 152 to the eyes.

In some embodiments, the compensator 156 includes an electronic component or a combination of an electronic component and a software component that performs compensation to compensate for any distortions or aberrations. In one aspect, the lens 154 introduces optical aberrations such as a chromatic aberration, a pin-cushion distortion, barrel distortion, etc. The compensator 156 may determine a compensation (e.g., predistortion) to apply to the image to be rendered from the image renderer 150 to compensate for the distortions caused by the lens 154, and apply the determined compensation to the image from the image renderer 150. The compensator 156 may provide the pre-distorted image to the electronic display 152.

In some embodiments, the console 102 is an electronic component or a combination of an electronic component and a software component that provides content to be rendered to the head wearable display 140. In one aspect, the console 102 includes a communication interface 122 and a content provider 124. These components may operate together to determine a view (e.g., a FOV of the user) of the artificial reality corresponding to the location of the head wearable display 140 and the gaze direction of the user of the head wearable display 140, and can generate image data indicating an image of the artificial reality corresponding to the determined view. In addition, these components may operate together to generate additional data associated with the image. Additional data may be information associated with presenting or rendering the artificial reality other than the image of the artificial reality. Examples of additional data include, hand model data, mapping information for translating a location and an orientation of the head wearable display 140 in a physical space into a virtual space (or simultaneous localization and mapping (SLAM) data), motion vector information, depth information, edge information, object information, etc. The console 102 may provide the image data and the additional data to the head wearable display 140 for presentation of the artificial reality. In other embodiments, the console 102 includes more, fewer, or different components than shown in FIG. 1A. In some embodiments, the console 102 is integrated as part of the head wearable display 140.

In some embodiments, the communication interface 122 is an electronic component or a combination of an electronic component and a software component that communicates with the head wearable display 140. The communication interface 122 may be a counterpart component to the communication interface 148 to communicate with a communication interface 122 of the console 102 through a communication link (e.g., wireless link). Through the communication link, the communication interface 122 may receive from the head wearable display 140 data indicating the determined location and/or orientation of the head wearable display 140, the determined gaze direction of the user, and the hand tracking measurement. Moreover, through the communication link, the communication interface 122 may transmit to the head wearable display 140 image data describing an image to be rendered and additional data associated with the image of the artificial reality.

The content provider 124 can include or correspond to a component that generates content to be rendered according to the location and/or orientation of the head wearable display 140. In some embodiments, the content provider 124 may incorporate the gaze direction of the user of the head wearable display 140, and a user interaction in the artificial reality based on hand tracking measurements to generate the content to be rendered. In one aspect, the content provider 124 determines a view of the artificial reality according to the location and/or orientation of the head wearable display 140. For example, the content provider 124 maps the location of the head wearable display 140 in a physical space to a location within an artificial reality space, and determines a view of the artificial reality space along a direction corresponding to the mapped orientation from the mapped location in the artificial reality space. The content provider 124 may generate image data describing an image of the determined view of the artificial reality space, and may transmit the image data to the head wearable display 140 through the communication interface 122. The content provider 124 may also generate a hand model corresponding to a hand of a user of the head wearable display 140 according to the hand tracking measurement, and generate hand model data indicating a shape, a location, and an orientation of the hand model in the artificial reality space. In some embodiments, the content provider 124 may generate additional data including motion vector information, depth information, edge information, object information, hand model data, etc., associated with the image, and transmit the additional data together with the image data to the head wearable display 140 through the communication interface 122. The content provider 124 may encode the image data describing the image, and can transmit the encoded data to the head wearable display 140. In some embodiments, the content provider 124 generates and provides the image data to the head wearable display 140 periodically (e.g., every 11 ms). In one aspect, the communication interface 122 can adaptively transmit the additional data to the head wearable display 140 as described below with respect to FIGS. 2A through 4.

Figure 1B:
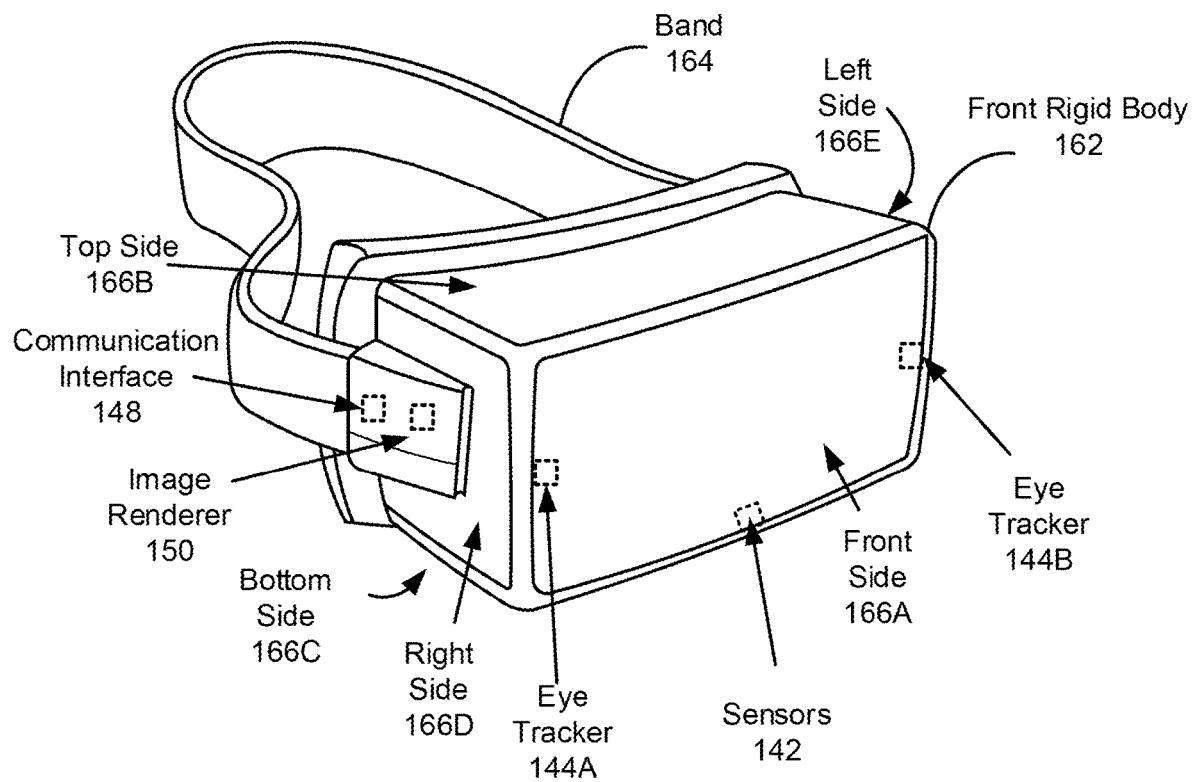
FIG. 1B is a diagram of a head wearable display, according to an example implementation of the present disclosure.

FIG. 1B is a diagram 160 of a head wearable display 140, in accordance with an example embodiment. In some embodiments, the head wearable display 140 includes a front rigid body 162 and a band 164. The front rigid body 162 includes the electronic display 152 (not shown in FIG. 1B), the lens 154 (not shown in FIG. 1B), the sensors 142, the eye trackers 144A, 144B, the communication interface 148, and the image renderer 150. In the embodiment shown by FIG. 1B, the communication interface 148, the image renderer 150, and the sensors 142 are located within the front rigid body 162, and may not visible to the user. In other embodiments, the head wearable display 140 has a different configuration than shown in FIG. 1B. For example, the communication interface 148, the image renderer 150, the eye trackers 144A, 144B, and/or the sensors 142 may be in different locations than shown in FIG. 1B.

Figure 2A:
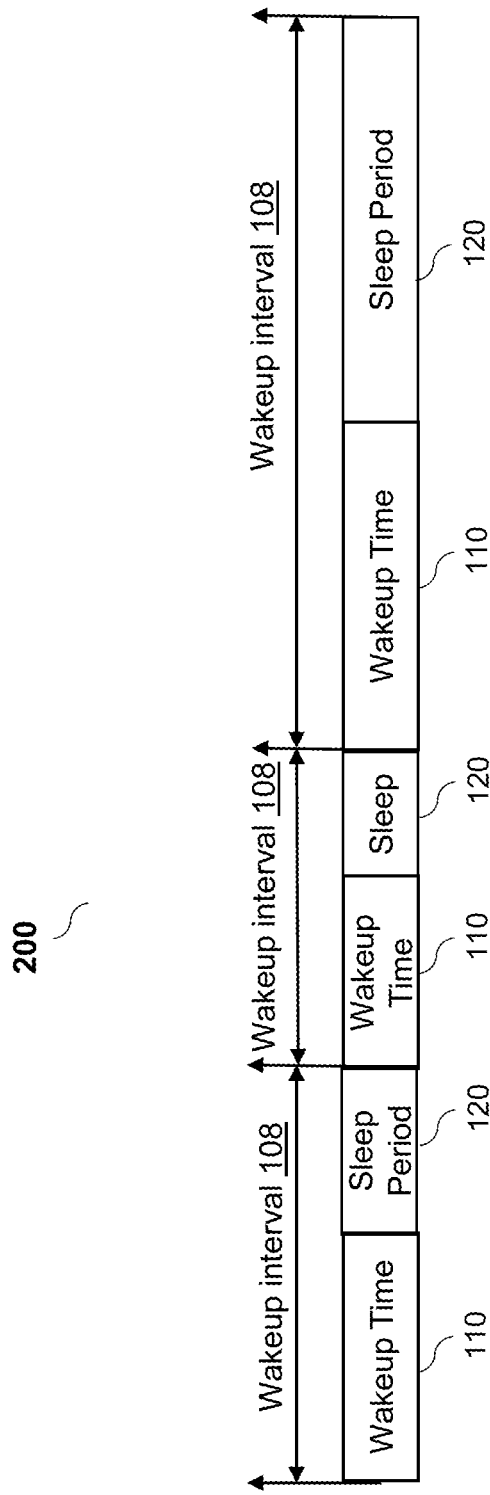
FIG. 2A is a timing diagram of multiple wake up intervals having varying durations, according to an example implementation of the present disclosure.

Now referring to FIG. 2A, a diagram 200 of multiple wake up interval 108 having varying durations is depicted. The diagram 200 includes three wake up intervals 108 each having different durations. For example, a first wake up interval 108 includes a first wake up time period 110 and a first sleep period 120. The first wake up time period 110 can include a first wake duration and the first sleep period 120 can include a first sleep duration. A second wake up interval 108 can include a second wake up time period 110 and a second sleep period 120.

The second wake up time period 110 can include a second wake duration and the second sleep period 120 can include a second sleep duration. A third wake up interval 108 can include a third wake up time period 110 and a third sleep period 120. The third wake up time period 110 can include a third wake duration and the third sleep period 120 can include a third sleep duration. In some embodiments, the third wake duration of the third wake up time period 110 can be greater than the first wake duration of the first wake up time period 110 and the second wake duration of the second wake up time period 110. The first wake duration of the first wake up time period 110 can be greater than the second wake duration of the second wake up time period 110.

In some embodiments, the third sleep duration of the third sleep period 120 can be greater than the first sleep duration of the first sleep period 120 and the second sleep duration of the second sleep period 120. The first sleep duration of the first sleep period 120 can be greater than the second sleep duration of the second sleep period 120. The different wake up intervals 108 depicted in FIG. 2A can include wake up time periods 110 and sleep periods 120 having different durations and may not include fixed durations as they durations can be determined dynamically, for example, during the respective wake up time period 110.

Figure 2B:
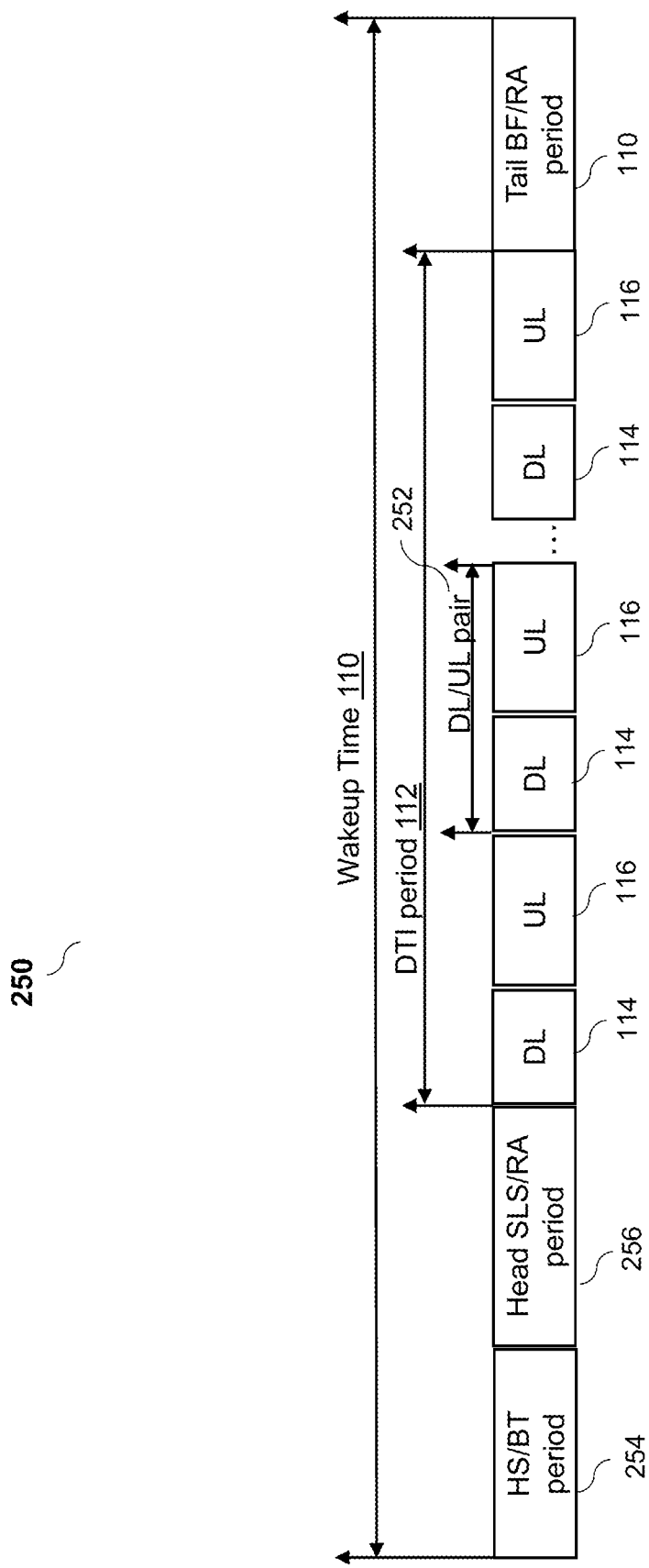
FIG. 2B is a timing diagram of a wake up time period having downlink and uplink periods of varying durations, according to an example implementation of the present disclosure.

Now referring to FIG. 2B, a timing diagram 250 of a wake up time period 110 having downlinks 114 and uplinks 116 of varying durations is depicted. The wake up time period 110 can include a handshake period/beam forming period 254. The handshake period/beam forming period 254 can include one or more handshake signals transmitted between the head wearable display 140 and the console 102 to initiate or start the wake up time period 110. The handshake period/beam forming period 254 can include a beam forming process to identify and select at least one beam from a plurality of beams to establish a channel 130 between the head wearable display 140 and the console 102. The wake up time period 110 can include a head SLS/RA access period 256 that may include an additional beam forming access period. For example, in some embodiments, the head wearable display 140 and/or the console 102 can test or re-do the beam selection and/or beam forming to test and verify the candidate beam selected for the channel 130 or select a new candidate beam for the channel 130 between the head wearable display 140 and the console 102.

The wake up time period 110 can include a data transmission interval 112 having a plurality of link pairs 252. In some embodiments, each of the link pairs 252 can include at least one downlink 114 and at least one uplink 116. The head wearable display 140 and/or the console 102 can dynamically determine and/or adjust a duration or end point for a downlink 114 or uplink 116, for example, during the respective downlink 114 or uplink 116. The downlinks 114 of different link pairs 252 can have different durations, or one or more downlinks 114 of a data transmission interval 112 can have the same duration. For example, the duration of the downlinks 114 can be dynamically determined and/or adjusted based in part on an amount of data to be transmitted during the downlink 114. In some embodiments, the head wearable display 140 and/or the console 102 can extend or otherwise modify the duration of the downlinks 114 dynamically and during the respective downlink 114. The uplinks 116 of different link pairs 252 can have different durations, or one or more uplinks 116 of a data transmission interval 112 can have the same duration. For example, the duration of an uplink 116 can be dynamically determined based in part on an amount of data to be transmitted during the uplink 116. In some embodiments, the head wearable display 140 and/or the console 102 can extend or otherwise modify the duration of the uplink 116 dynamically and during the respective uplink 116. The data transmission interval 112 can include a single link pair 252 or multiple link pairs 252.

In some embodiments, the wake up time period 110 can include a tail BF/RA (e.g., beamforming/resource access) period 258. The tail BF/RA period 258 can include or correspond to an additional beam forming access period to establish beam configuration for a next or subsequent wake up time period 110 between the head wearable display 140 and the console 102.

Figure 3A:
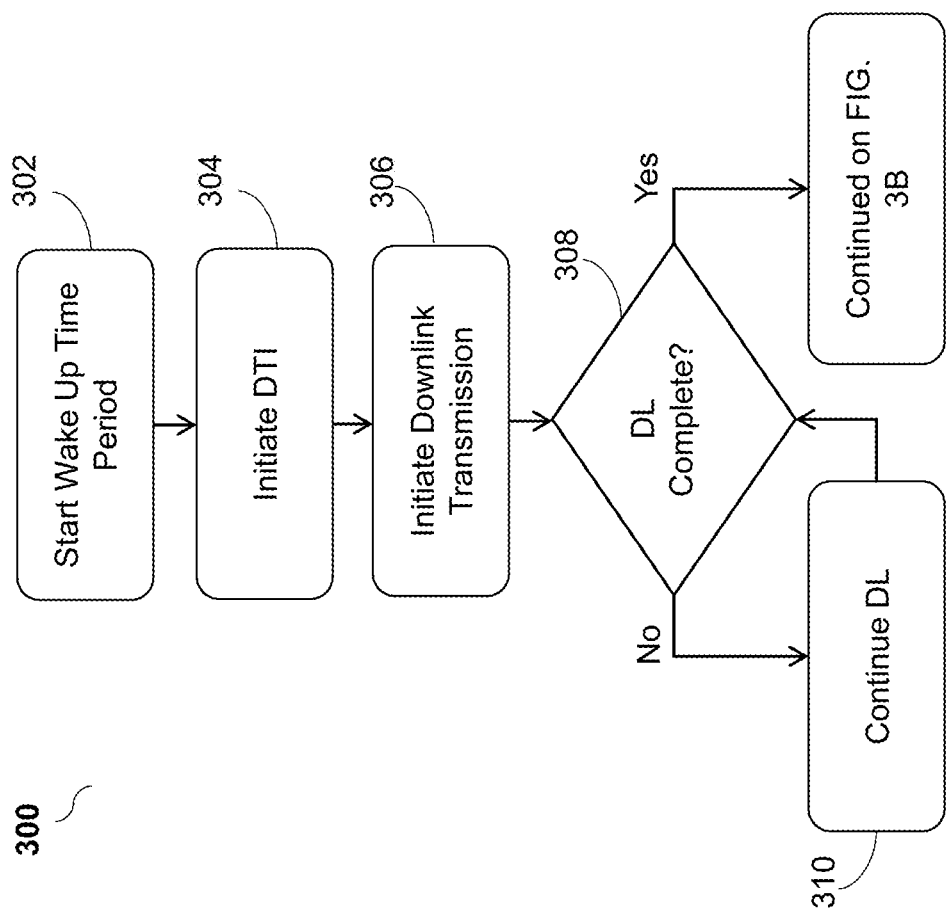
FIGS. 3A-3C include a flow chart illustrating a process or method for dynamically scheduling for communications between a console and head wearable display, according to an example implementation of the present disclosure.
Figure 3B:
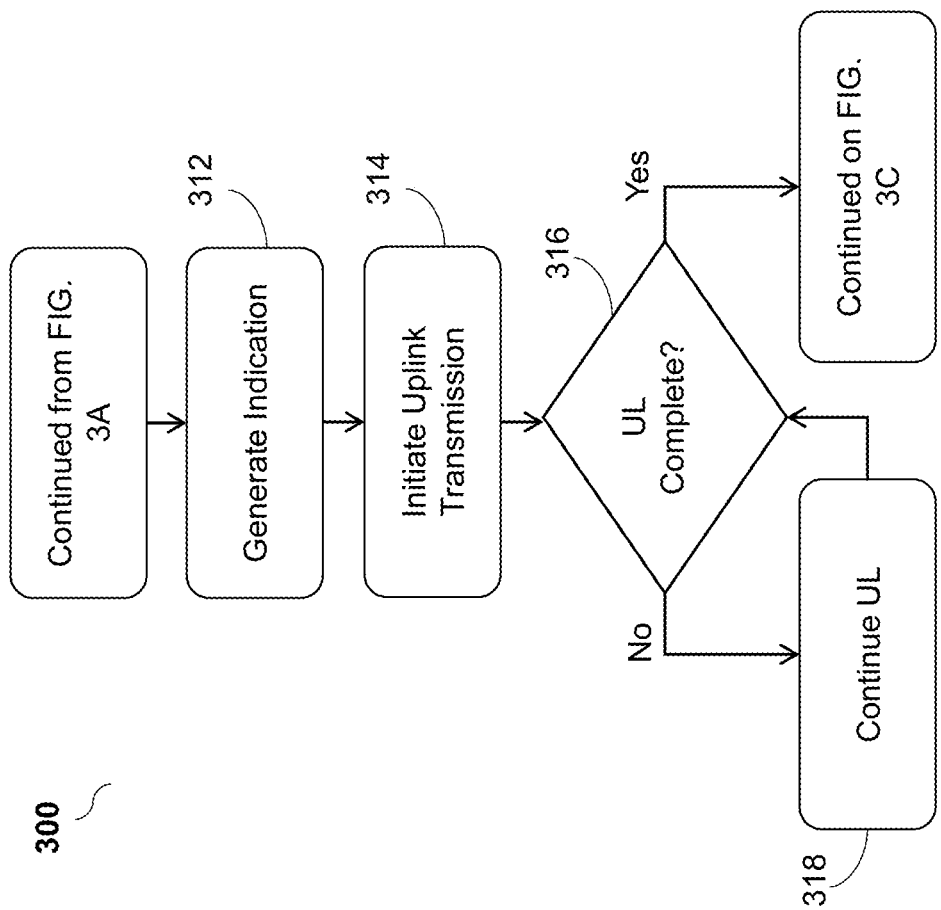
Figure 3C:
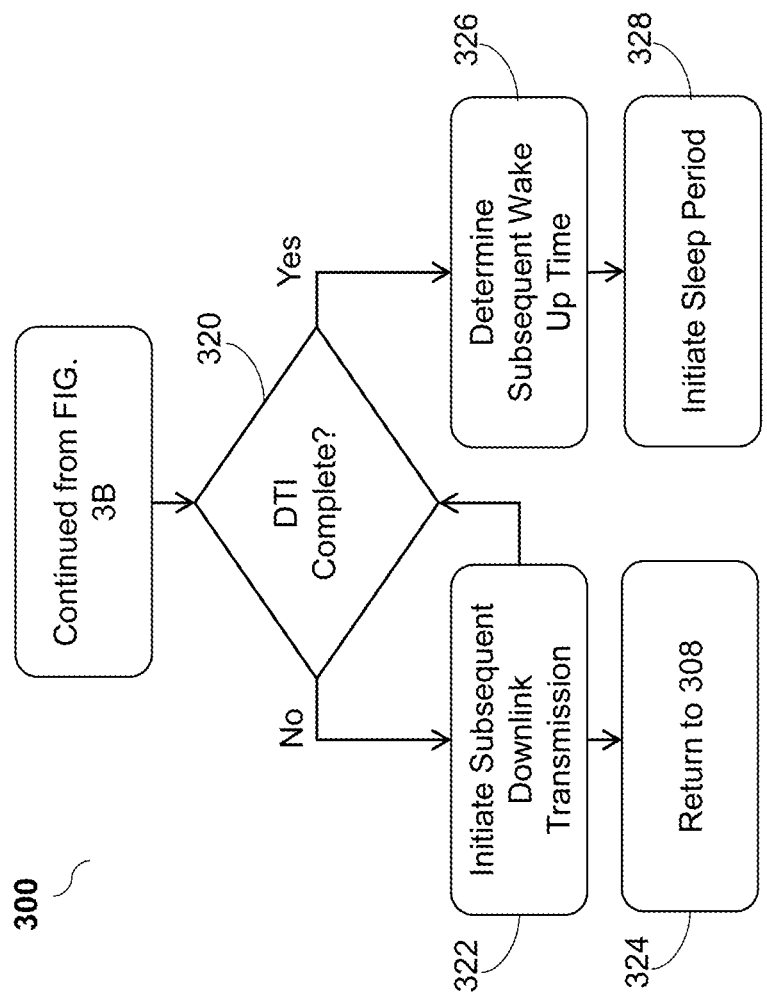

Now referring to FIGS. 3A-3C, a method 300 for dynamic scheduling is depicted. In brief overview, the method 300 can include one or more of: starting a wake up time period (302), initiating a data transmission interval (304), initiating a downlink transmission (306), determining if the downlink transmission is complete (308), continuing the downlink transmission (310), generating an indication (312), initiating an uplink transmission (314), determining if the uplink transmission is complete (316), continuing the uplink transmission (318), determining if the data transmission interval is complete (320), initiating a subsequent downlink transmission (322), determining if subsequent downlink transmission is complete (324), determining a subsequent wake up time (326), and initiating a sleep period (328). Any of the foregoing operations may be performed by any one or more of the components or devices described herein, for example, the console 102 and/or the head wearable display 140.

Referring to 302, and in some embodiments, a wake up time period can start or begin. In some embodiments, the head wearable display 140 can transmit an indication, command or instruction to the console 102 to initiate a communication session or data transfer between the head wearable display 140 and the console 102 through a channel 130 between the head wearable display 140 and the console 102. For example, the head wearable display 140 and/or the console 102 can exit or end a sleep period 120 and transmit a signal or wake up notification to start the wake up time period 110 or wake up time interval 108. The wake up time period 110 can include one or more handshake signals between the head wearable display 140 and the console 102 to start a data transfer session. The handshake signal can include one or more access rules to establish protocols and/or configurations for the channel 130 (e.g., communication link) between the head wearable display 140 and the console 102.

The handshake signals can include or correspond to a beam tracking and/or beam forming period to identify at least one beam to establish the channel 130 between the head wearable display 140 and the console 102. For example, the head wearable display 140 and/or console 102 can transit one or more signals (e.g., data bursts) to identify a best beam or beam having a strongest signal (e.g., according to signal to noise ratio). The wake up time period 110 can include at least one data transmission interval 112.

Referring to 304, and in some embodiments, a data transmission interval can be initiated. The head wearable display 140 and/or console 102 can initiate a data transmission interval 112. In some embodiments, the head wearable display 140 can dynamically determine a duration for the data transmission interval 112. The head wearable display 140 and/or the console 102 can estimate (e.g., dynamically estimate) an expected duration for the data transmission interval 112 between the head wearable display 140 and the console 102 according to or based in part on an amount of data to be transferred and/or one or more properties of a channel 130 between the head wearable display 140 and the console 102. The data transmission interval 112 can include a first downlink transmission 114 and an uplink transmission 116. For example, the head wearable display 140 and/or console 102 can determine an amount of data to be transmitted and properties of the channel 130, including but not limited to, a speed, stability, interference level, and/or bandwidth of the channel 130. The head wearable display 140 can determine an expected duration for the data transmission interval 112 prior to beginning the data transmission interval 112 or as the data transmission interval 112 is starting.

In some embodiments, the head wearable display 140 can initiate the data transmission interval 112 without a determined duration and can determine the duration during the respective data transmission interval 112. For example, the head wearable display 140 can determine the amount of data as the data is being accessed, generated and/or transmitted, and can dynamically modify the duration and/or a number of downlink/uplink pairs 252 of the data transmission interval 112 during the respective data transmission interval 112.

Referring to 306, and in some embodiments, a downlink transmission can be initiated. The head wearable display 140 can initiate, at a first time instance 118, a first downlink 114 transmission to a console 102. The head wearable display 140 can begin transmitting data or information to the console 102. In some embodiments, the head wearable display 140 can transmit an indication, instruction, command or consent to agree to begin transmitting data to the console 102. For example, the data can include any information corresponding to the head wearable display, such as but not limited to, sensor data, location data, configuration data, settings, scheduling and/or data from a previous user session with the head wearable display 140. The head wearable display 140 can determine an amount of data to be transmitted during the downlink 114. In some embodiments, the head wearable display 140 can estimate a duration or a time period for the first downlink 114 transmission prior to initiating the first downlink 114 or during the first downlink 114 based in part on an expected or known amount of data to be transmitted during the downlink 114 and/or one or more properties of the channel 130 between the head wearable display 140 and the console 102.

Referring to 308, and in some embodiments, a determination can be made if the downlink transmission is complete. In some embodiments, the head wearable display 140 can compare the estimated duration or time period for the downlink 114 to a current duration or time period for the downlink 114 to determine if the downlink 114 is complete. In some embodiments, the head wearable display 140 can initiate s downlink 114 that has no predetermined duration or expected completion time. For example, the duration or length of the downlink 114 can be determined during the respective downlink 114. The head wearable display 140 can determine if there is any additional data to transmit to the console 102. For example, in some embodiments, the head wearable display 140 can determine the amount of data already transmitted to the console 102 during the downlink 114 and compare the determined amount to a previous determined or expected amount of data to be transmitted to the console 102 for the downlink 114.

Referring to 310, and in some embodiments, the downlink transmission can continue. In some embodiments, a determination can be made that the downlink transmission is not complete. The head wearable display 140 can determine that there is additional data to transmit during the downlink 114 and to continue the downlink 114 to the console 102. For example, the head wearable display 140 can determine that there is additional data to transmit for the first downlink transmission 114 and responsive to the determination, continue to transfer data to the console 102 beyond an estimated duration or estimated time period for the first downlink transmission 114. In some embodiments, the head wearable display 140 can continue to transmit data to the console 102 until all of the downlink data has been (generated or accessed and/or) transmitted, or until a determined level of data has been transmitted. In some embodiments, the head wearable display 140 can continually monitor the amount of data transmitted during the downlink 114, and the method 300 can return to (308) to determine if the current downlink 114 is complete.

Referring to 312, and in some embodiments, an indication can be generated. The head wearable display 140 can generate an indication (e.g., command, instruction) for the console 102 to indicate or instruct that the downlink 114 is complete. In some embodiments, the head wearable display 140 can dynamically indicate, to the console 102, an end of the first downlink transmission 114, at a second time instance 118 when transfer of data of the first downlink transmission 114 is complete. For example, the head wearable display 10 can dynamically determine or detect during the downlink 114 that the downlink 114 is complete (or is completing), or that a last packet of the downlink 114 is being transmitted or has been transmitted. The head wearable display 140 can generate and provide an indication to the console 102 that the downlink 114 is complete, for example, as the downlink 114 finishes. In some embodiments, the head wearable display 10 can dynamically provide the indication to the console 102 with a final or last packet of the downlink 114 to dynamically indicate that the downlink 114 from the head wearable display 140 to the console 102 is complete or finished (or is completing).

Referring to 314, and in some embodiments, an uplink transmission can be initiated. The head wearable display 140 can dynamically cause, relative to the second time instance 118, the console 102 to begin an uplink 116 transmission. The second time instance 118 can include a time value or time period after or later than the first time instance 118, and different from the first time instance 118. The indication transmitted by the head wearable display 140 to the console 102 can cause the console 102 to begin or initiate an uplink portion of the data transmission interval 112 between the head wearable display 140 and the console 102. In some embodiments, the console 102 can dynamically initiate the uplink 116 responsive to receiving the indication from the head wearable display 140. For example, the console 102 may not wait for a predetermined or fixed time period to begin the uplink 116 and instead, dynamically initiate the uplink 116 responsive to receiving the indication of the end of the downlink 114 from the head wearable display 140.

In some embodiments, the console 102 can transmit an indication, instruction, command or consent to the head wearable display 140 to agree to begin transmitting data for the uplink 116. The uplink data can include any information corresponding to the head wearable display 140 and/or console 102, such as but not limited to, location data, configuration data, settings, scheduling and/or channel data (e.g., communications link data). The console 102 can determine an amount of data to be transmitted during the uplink 116. In some embodiments, the console 102 can estimate a duration or a time period for the uplink 116 transmission prior to initiating the uplink 116 or during the uplink 116, based in part on an amount of data to be transmitted during the uplink 116 and/or one or more properties of the channel 130 between the head wearable display 140 and the console 102.

Referring to 316, and in some embodiments, a determination can be made if the uplink transmission is complete. In some embodiments, the console 102 can initiate an uplink 116 having no predetermined duration or expected completion time. For example, the duration or length of the uplink 116 can instead be determined during the respective uplink 116. The console 102 can determine (e.g., in the course of uplink transmission) if there is any additional data to transmit to the head wearable display 140. For example, in some embodiments, the console 102 can determine the amount of data already transmitted to the head wearable display 140 during the uplink 116 and compare the determined amount to a previously determined or expected amount of data to be transmitted to the head wearable display 140 for the uplink 116.

Referring to 318, and in some embodiments, the uplink transmission can continue. In some embodiments, a determination can be made that the uplink transmission is not complete. The console 102 can determine that there is additional data to transmit during the uplink 116 (e.g., during uplink transmission) and to continue the uplink transmission (by extending the uplink period 116) to the head wearable display 140. In some embodiments, the console 102 can determine that there is additional data to transmit for the uplink 116 transmission and responsive to the determination, continue to transfer data to the head wearable display 140 beyond the estimated time period for the uplink transmission. The console 102 can continue to transmit data to the head wearable display 140 until all of the downlink data has been transmitted or until a determined level of data has been transmitted. In some embodiments, the console 102 can continually monitor the amount of data transmitted during the uplink 116 and the method 300 can return/proceed to (316) to determine if the current uplink 116 is complete.

Referring to 320, and in some embodiments, a determination can be made if the data transmission interval 112 is complete. For example, the console 102 can dynamically determine during the uplink 116 if the uplink 116 is complete or if additional data is to be (accessed or generated and) transmitted during the uplink 116. In some embodiments, the console 102 can dynamically determine if a last or final packet of the uplink 116 is being transmitted or if additional packets are to be transmitted during the uplink 116. The uplink 116 can correspond to an end of the current data transmission interval 112. In some embodiments, the console 102 can determine if the current data transmission interval 112 is to be extended. For example, the console 102 can determine if an additional link pair 252 (e.g., DL/UL pair) should be added to the data transmission interval 112. The console 102 can determine to extend or modify the data transmission interval 112 based in part on an amount of data to be transmitted and/or the properties (e.g., speed, bandwidth) of the channel 130 between the console 102 and the head wearable display 140.

Referring to 322, and in some embodiments, a subsequent downlink transmission can be initiated. The console 102 can determine that the uplink transmission is complete and that additional data is to be transmitted between the console 102 and the head wearable display 140. For example, the console 102 and/or head wearable display 140 can dynamically determine during the uplink 116 that the uplink transmission is complete and that additional data is to be transmitted through a second or additional downlink transmission. The console 102 and/or head wearable display 140 can determine to extend or modify the duration of the data transmission interval 112 to support the second or additional downlink transmission and/or a second or additional uplink transmission. In some embodiments, the head wearable display 140 can receive an indication to dynamically start a second downlink 114 transmission, at a third time instance 118 when transfer of data of the uplink 116 transmission or previous uplink 116 transmission is complete.

In some embodiments, the console 102 and/or head wearable display 140 can dynamically determine during the uplink 116 that the uplink transmission is complete and that additional data is to be transmitted through one or more additional link pairs 252 (e.g., DL/UL pairs). The console 102 and/or head wearable display 140 can determine to extend or modify the duration of the data transmission interval 112 to support one or more additional link pairs 252. The console 102 and/or head wearable display 140 can dynamically determine at a fourth or subsequent time instance 118 to dynamically support the addition of one or more link pairs 252 for the data transmission interval 112 between the head wearable display 140 and the console 102 according to or based in part on data available at the fourth or subsequent time instance 118. In some embodiments, each link pair 252 can include at least one downlink 114 transmission and at least one uplink transmission 116. The console 102 and/or head wearable display 140 can generate an indication to initiate or start a subsequent downlink 114 for the additional link pair 252 of the data transmission interval 112. The head wearable display 140 can initiate, at the fourth or subsequent time instance 118, a second or subsequent downlink 114 transmission to the console 102. In some embodiments, the first wake up time period 110 can include the first downlink 114 transmission, the uplink 116 transmission and the second downlink 114 transmission, and the console 102 can dynamically determine to add a second wake up time period 110 to support additional one or more downlink transmissions and one or more uplink transmissions or one or more additional link pairs 252. Referring to 324, and in some embodiments, the method 300 can return/proceed to (308) to determine if the second or subsequent downlink 114 is complete.

Referring to 326, and in some embodiments, a subsequent wake up time 110 can determined. The console 102 and/or the head wearable display 140 can determine that the uplink transmission is complete and that no additional data is to be transmitted between the console 102 and the head wearable display 140. In some embodiments, the console 102 can dynamically determine that a last or final packet of the uplink 116 is being transmitted or has been transmitted to the head wearable display 140. The uplink period 116 can correspond to an end of the current data transmission interval 112 and the console 102 and/or the head wearable display 140 can determine that the current data transmission interval 112 in complete.

The console 102 and/or head wearable display 140 can dynamically determine or configure a duration for a sleep time period 120 subsequent to the end of the first or previous wake up time period 110 (e.g., between a first wake up time period 110 and a second wake up time period 110). The console 102 and/or the head wearable display 140 can determine a subsequent wake up time period 110 for a subsequent data transmission interval 112 between the console 102 and the head wearable display 140. In some embodiments, the console 102 and/or the head wearable display 140 can determine the subsequent wake up time period 110 based in part on the amount of data transmitted during one or more previous data transmission intervals 112 and/or an expected amount of data to be transmitted during the subsequent data transmission interval 112.

Referring to 328, and in some embodiments, a sleep period 120 can be initiated. The duration or time period for the sleep period 120 can be dynamically determined or adjusted by the head wearable display 140 and/or the console 102 at the end of a previous wake up time period 110 or during the previous wake up time period 110. In some embodiments, the duration or time period for the sleep period 120 can be selected based at least in part on a determined time instance 118 for a next or subsequent wake up time period 110 between the head wearable display 140 and the console 102.

B. Computing System

Various operations described herein can be implemented on computer systems. FIG. 4 shows a block diagram of a representative computing system 414 usable to implement the present disclosure. In some embodiments, the console 102 and head wearable display 140 of FIGS. 1A-1B are implemented by the computing system 414. Computing system 414 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 414 can be implemented to provide VR, AR, MR experience. In some embodiments, the computing system 414 can include conventional computer components such as processors 416, storage device 418, network interface 420, user input device 422, and user output device 424.

Network interface 420 can provide a connection to a wide area network (e.g., the Internet) to which WAN interface of a remote server system is also connected. Network interface 420 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 422 can include any device (or devices) via which a user can provide signals to computing system 414; computing system 414 can interpret the signals as indicative of particular user requests or information. User input device 422 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 424 can include any device via which computing system 414 can provide information to a user. For example, user output device 424 can include a display to display images generated by or delivered to computing system 414. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 424 can be provided in addition to or instead of a display. Examples include indicator lights, speakers, tactile "display" devices, printers, and so on.

Some implementations include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 416 can provide various functionality for computing system 414, including any of the functionality described herein as being performed by a server or client, or other functionality associated with message management services.

It will be appreciated that computing system 414 is illustrative and that variations and modifications are possible. Computer systems used in connection with the present disclosure can have other capabilities not specifically described here. Further, while computing system 414 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
    initiating, by a head wearable display at a first time instance, a first downlink transmission to a console;
    dynamically transmitting, by the head wearable display to the console, a first indication indicating an end of the first downlink transmission, at a second time instance when transfer of data of the first downlink transmission is complete;
    dynamically causing, by the head wearable display, relative to the second time instance, the console to begin an uplink transmission, in response to the first indication indicating the end of the first downlink transmission;
    receiving, by the head wearable display from the console, a second indication indicating an end of the uplink transmission; and
    dynamically starting, by the head wearable display, a second downlink transmission, at a third time instance, in response to the second indication indicating the end of the uplink transmission.

2. The method of claim 1, further comprising:
    estimating an expected duration for a data transmission interval between the head wearable display and the console according to an amount of data to be transferred and properties of a channel between the head wearable display and the console, the data transmission interval including the first downlink transmission and the uplink transmission.

3. The method of claim 1, further comprising:
    estimating, by the head wearable display, a time period for the first downlink transmission.

4. The method of claim 3, further comprising:
    determining, by the head wearable display, that there is additional data to transmit for the first downlink transmission; and responsive to the determination, continuing, by the head wearable display, to transfer data to the console beyond the estimated time period for the first downlink transmission.

5. The method of claim 1, further comprising:
estimating, by the console, a time period for the uplink transmission.

6. The method of claim 5, further comprising:
determining, by the console, that there is additional data to transmit for the uplink transmission; and
responsive to the determination, continuing, by the console, to transfer data to the head wearable display beyond the estimated time period for the uplink transmission.

7. The method of claim 1, further comprising:
dynamically supporting, by the head wearable display at a fourth time instance, addition of one or more link pairs for a data transmission interval between the head wearable display and the console according to data available at the fourth time instance, each link pair including at least one downlink transmission and at least one uplink transmission.

8. The method of claim 1, wherein a first wake up time period includes a time period allocated for the first downlink transmission, the uplink transmission and the second downlink transmission, and the method further comprises dynamically determining, by the console, to add a second wake up time period to support additional one or more downlink transmissions and one or more uplink transmissions.

9. The method of claim 8, further comprising:
dynamically configuring a duration of a sleep time period between the first wake up time period and the second wake up time period.

10. A head wearable display comprising:
one or more processors configured to:
initiate, at a first time instance, a first downlink transmission to a console;
dynamically transmit, to the console, a first indication indicating an end of the first downlink transmission, at a second time instance when transfer of data of the first downlink transmission is complete;
dynamically cause the console to begin an uplink transmission relative to the second time instance, in response to the first indication indicating the end of the first downlink transmission;
receive, from the console, a second indication indicating an end of the uplink transmission; and
dynamically start a second downlink transmission, at a third time instance, in response to the second indication indicating the end of the uplink transmission.

11. The head wearable display of claim 10, wherein the one or more processors is further configured to estimate a time period for the first downlink transmission.

12. The head wearable display of claim 11, wherein the one or more processors is further configured to:
determine that there is additional data to transmit for the first downlink transmission; and
responsive to the determination, continue to transfer data to the console beyond the estimated time period for the first downlink transmission.

13. The head wearable display of claim 10, wherein the one or more processors is further configured to cause the console to estimate a time period for the uplink transmission.

14. The head wearable display of claim 13, wherein the one or more processors is further configured to:
cause the console to determine that there is additional data to transmit for the uplink transmission; and
responsive to the determination, causing the console to continue to transfer data to the head wearable display beyond the estimated time period for the uplink transmission.

15. The head wearable display of claim 10, wherein the one or more processors is further configured to dynamically support, at a fourth time instance, addition of one or more link pairs for a data transmission interval between the head wearable display and the console according to data available at the fourth time instance, each link pair including at least one downlink transmission and at least one uplink transmission.

16. The head wearable display of claim 10, wherein a first wake up time period includes a time period allocated for the first downlink transmission, the uplink transmission and the second downlink transmission, and the one or more processors is further configured to dynamically support addition of a second wake up time period to support additional one or more downlink transmissions and one or more uplink transmissions.

17. The head wearable display of claim 16, wherein the one or more processors is further configured to dynamically configure a duration of a sleep time period between the first wake up time period and the second wake up time period.

18. A non-transitory computer readable medium storing instructions when executed by one or more processors cause the one or more processors to:
initiate, at a first time instance, a first downlink transmission to a console;
dynamically transmit, to the console, a first indication indicating an end of the first downlink transmission, at a second time instance when transfer of data of the first downlink transmission is complete;
dynamically cause the console to begin an uplink transmission relative to the second time instance, in response to the first indication indicating the end of the first downlink transmission;
receive, from the console, a second indication indicating an end of the uplink transmission; and
dynamically start a second downlink transmission, at a third time instance, in response to the second indication indicating the end of the uplink transmission.

19. The non-transitory computer readable medium of claim 18, further storing instructions when executed by the one or more processors further cause the one or more processors to estimate a time period for the first downlink transmission.

20. The non-transitory computer readable medium of claim 19, further storing instructions when executed by the one or more processors further cause the one or more processors to:
determine that there is additional data to transmit for the first downlink transmission; and
responsive to the determination, continue to transfer data to the console beyond the estimated time period for the first downlink transmission.

\* \* \* \* \*